No. 841,788. PATENTED JAN. 22, 1907.
W. LAMMERSEN.
MEANS FOR MAKING STONE FACED BRICK.
APPLICATION FILED FEB. 23, 1906.
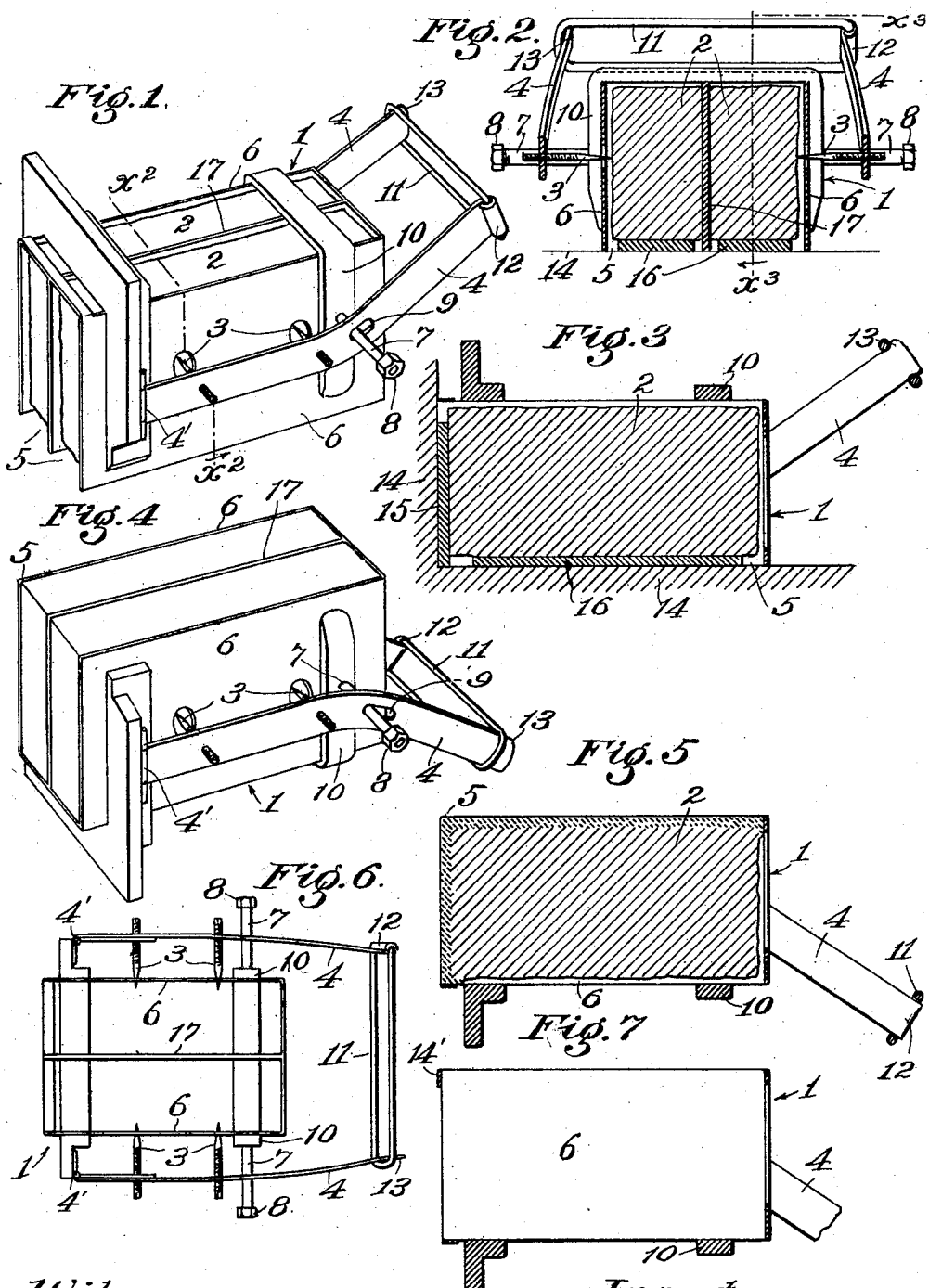
Witnesses:
C. C. Holly
J. Townsend
Inventor:
William Lammersen.
by James R. Townsend
his atty

UNITED STATES PATENT OFFICE.

WILLIAM LAMMERSEN, OF LOS ANGELES, CALIFORNIA.

MEANS FOR MAKING STONE-FACED BRICK.

No. 841,788. Specification of Letters Patent. Patented Jan. 22, 1907.

Application filed February 23, 1906. Serial No. 302,398.

*To all whom it may concern:*

Be it known that I, WILLIAM LAMMERSEN, a citizen of the United States, residing at Los Angeles, in the county of Los Angeles and State of California, have invented a new and useful Means for Making Stone-Faced Brick, of which the following is a specification.

The object of this invention is to provide simple and convenient means for producing a substitute for pressed brick without expensive machinery or special kilns and wherever ordinary burnt brick and Portland cement or the like are available.

This invention is designed for carrying on the process and producing the product set forth in my companion application, Serial No. 302,397, filed on the 23d day of February, 1906.

The accompanying drawings illustrate the invention.

Figure 1 is a perspective view of a mold constructed in accordance with my invention, two bricks being secured in the same. Fig. 2 is a section of the same on line $x^2 \, x^2$. Fig. 3 is a longitudinal section on line $x^3 \, x^3$, Fig. 2, showing the mold in position in a form which holds a brick in position in the mold. Fig. 4 is a view of the mold inverted after the cement-mortar has been applied to the bricks. Fig. 5 is a longitudinal section of Fig. 4, showing the brick and the artificial-stone facing thereon. Fig. 6 is a plan of the mold shown in Fig. 1. Fig. 7 is a longitudinal section of the device adapted for making stretcher-bricks, the same being provided with a strap, which takes the place of one wall of the form shown in Fig. 3.

1 is a frame adapted to receive a brick or like body 2.

3 4 designate means mounted on the frame 1 to engage the brick or body 2 and hold it in a determined position therein. An edge 5 of the frame is open to receive plastic material for application to said body 2. The sides 6 of the frame are adapted to give form to the edges of the plastic material when applied to the body 2. Said body-holding means 3 4 comprise points or pins 3 in the form of set-screws and spring-handles 4, which handles are fastened to the frame 1 by hinges 4' and are guided by guides or rods 7, having nuts or heads 8 to serve as stops for the handles. The guides or rods pass through slots 9 in the handles and are fastened to braces 10, that strengthen the frame.

11 is a link for holding the handles 4 toward each other and temporarily fastening them together, the same being hinged to one handle at 12 and hooking over the end 13 of the other handle.

14 designates the form, and 15 16 blocks or cleats thereon to appropriately position the bricks or bodies 2 in the mold.

14' designates a strap fastened to frame 1 and serving as a substitute for the form 14 in cases where the mold is to be used for stretcher-bricks instead of corner-bricks and faced on one edge only. It is obvious that a single mold may be used instead of a double mold, as shown, and I do not limit myself to any particular number of compartments in the mold.

17 is a partition in the double mold shown in Figs. 1, 2, 4, and 6.

In practice the workman will place the bricks 2 in position in the form resting against the blocks 15 16, as shown in Fig. 3, and will then place the mold-frame 1 in position on the bricks, as shown in Fig. 2. He will then draw the handles 4 toward each other, thus causing the points 3 to engage the bodies 2, which will force said bodies against the middle partition 17 and hold them firmly in the proper position in the mold, whereupon the workman will invert the mold to the position shown in Fig. 4 and will apply cement-mortar to form the facing on the bricks. After smoothing the same the plastic surface of the bricks may be dipped into crushed natural stone, and then the bricks can be set on a smooth plate (not shown) and the link 11 released, whereupon the handles 4 spring apart, thus withdrawing the points 3 from the brick, and thereby releasing the same, whereupon the mold is ready for further use.

What I claim is—

1. A frame adapted to receive a brick or like body, means mounted on the frame to engage said body and hold it in determined position therein; an edge of said frame being open to receive plastic material for application to said body, the sides of said frame being adapted to give form to the edges of the plastic material when applied to said body.

2. A frame open at an edge to receive one or more bricks, means connected with the frame to hold the bricks in determined position in the frame, means for spacing the bricks at a determined distance from the open edge thereof.

3. A frame provided with a longitudinal partition and with an opening at an edge and provided with openings in its sides, handles fastened to the frame and provided with adjustable points projecting through said openings, and means for fastening said handles together.

In testimony whereof I have hereunto set my hand, at Los Angeles, California, this 15th day of February, 1906.

WILLIAM LAMMERSEN.

In presence of—
JAMES R. TOWNSEND,
JULIA TOWNSEND